(12) United States Patent
Katzenberger et al.

(10) Patent No.: US 7,437,904 B2
(45) Date of Patent: Oct. 21, 2008

(54) COLDWORK TOOL ASSEMBLY

(75) Inventors: Michael D Katzenberger, Florissant, MO (US); James A. Hammond, Jr., O'Fallon, MO (US); George E. Anderson, Alton, IL (US); Brian J. Martinek, Troy, MO (US)

(73) Assignee: The Boeing Company, Chicagp, IL (US)

( * ) Notice: Subject to any disclaimer, the term of this patent is extended or adjusted under 35 U.S.C. 154(b) by 0 days.

(21) Appl. No.: 11/608,656

(22) Filed: Dec. 8, 2006

(65) Prior Publication Data

US 2008/0134746 A1    Jun. 12, 2008

(51) Int. Cl.
*B21D 39/08* (2006.01)
*B21D 9/05* (2006.01)
*B21D 15/10* (2006.01)
*B23B 5/28* (2006.01)

(52) U.S. Cl. .................. 72/391.2; 72/370.07; 72/466.4; 29/523

(58) Field of Classification Search ............ 72/370.07, 72/391.2, 417, 466.4, 466.6, 481.3, 481.8, 72/477, 391.8, 393; 29/243.521, 525
See application file for complete search history.

(56) References Cited

U.S. PATENT DOCUMENTS

| 2,473,913 | A | | 6/1949 | Shaff |
| 4,557,033 | A | * | 12/1985 | Champoux .................. 29/525 |
| 5,433,100 | A | | 7/1995 | Easterbrook et al. |
| 5,953,952 | A | * | 9/1999 | Strickland .................. 72/466.9 |
| 6,698,268 | B2 | | 3/2004 | Woods et al. |
| 2006/0219440 | A1 | | 10/2006 | MacKay et al. |

FOREIGN PATENT DOCUMENTS

EP    1872895    1/2008

OTHER PUBLICATIONS

International Search Report and Written Opinion on corresponding PCT application (PCT/US2007/023597) from International Searching Authority (EPO) mailed Apr. 15, 2008.

* cited by examiner

*Primary Examiner*—Derris H Banks
*Assistant Examiner*—Teresa Bonk
(74) *Attorney, Agent, or Firm*—Klein, O'Neill & Singh, LLP

(57) ABSTRACT

A coldwork tool assembly including an outer housing and an inner housing in telescopic arrangement with each other and a retaining collar configured to accommodate a plurality of mandrel configurations. One of a plurality of various mandrels is removably coupled to the inner housing using the retaining collar to secure the mandrel to the inner housing as the inner housing moves between a contracted and an expanded position relative to the outer housing.

13 Claims, 6 Drawing Sheets

COLDWORK TOOL ASSEMBLY

BACKGROUND

1. Field of Invention

The disclosure is related to an apparatus for coldwork a material, and in particular to a coldwork tool that allows for the use of interchangeable mandrels.

2. Related Art

In some fastening applications, a drilled hole is expanded to a predetermined size before a fastener is inserted. The hole is expanded in a manner referred to as coldwork to increase the strength of the material around the hole, which allows the material to better resist localized stress concentrations. Specifically, coldwork is the process of plastically deforming a metal at a temperature below its annealing point in order to increase the hardness and tensile strength of the metal.

This process is performed during fabrication and later in the field for aircraft repair. Typical coldwork equipment includes high pressure pumps and hydraulic lines that must be routed to the structure and require air or electricity to use.

Current commercial technology has addressed production issues by creating a central hydraulic system on assembly tooling to alleviate pump location issues. However, the tooling has high pressure hydraulic lines attached to structures and is placed very near personnel.

What is needed is a hand operated solution to coldwork that works with multiple styles of cold working mandrels.

SUMMARY OF THE INVENTION

The present disclosure provides a hand operated coldwork tool that can be used with more than one commercially available mandrel style. The coldwork tool has increased diameter range over most previous solutions and works in limited access applications. Because the coldwork tool is manually operated, the tool can be used in remote locations for field repair as well as production applications where traditional methods are cost prohibitive.

The coldwork tool provides the ability to work with various types of commercially available mandrels. The coldwork tool extends the range of what can be pulled through a work piece. In addition, the coldwork tool has interchangeable mandrel that can be used without having to change the tool. The coldwork tool size is reduced so it works well in tight spaces. Because the tool is manual it does not require the use of hydraulic lines or compressed air to power the tool.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the disclosure are now described with reference to the drawings of various objects of the disclosure. The illustrated embodiments are intended to illustrate, but not to limit the invention. The drawings include the following.

DETAILED DESCRIPTION

Figure 1A:
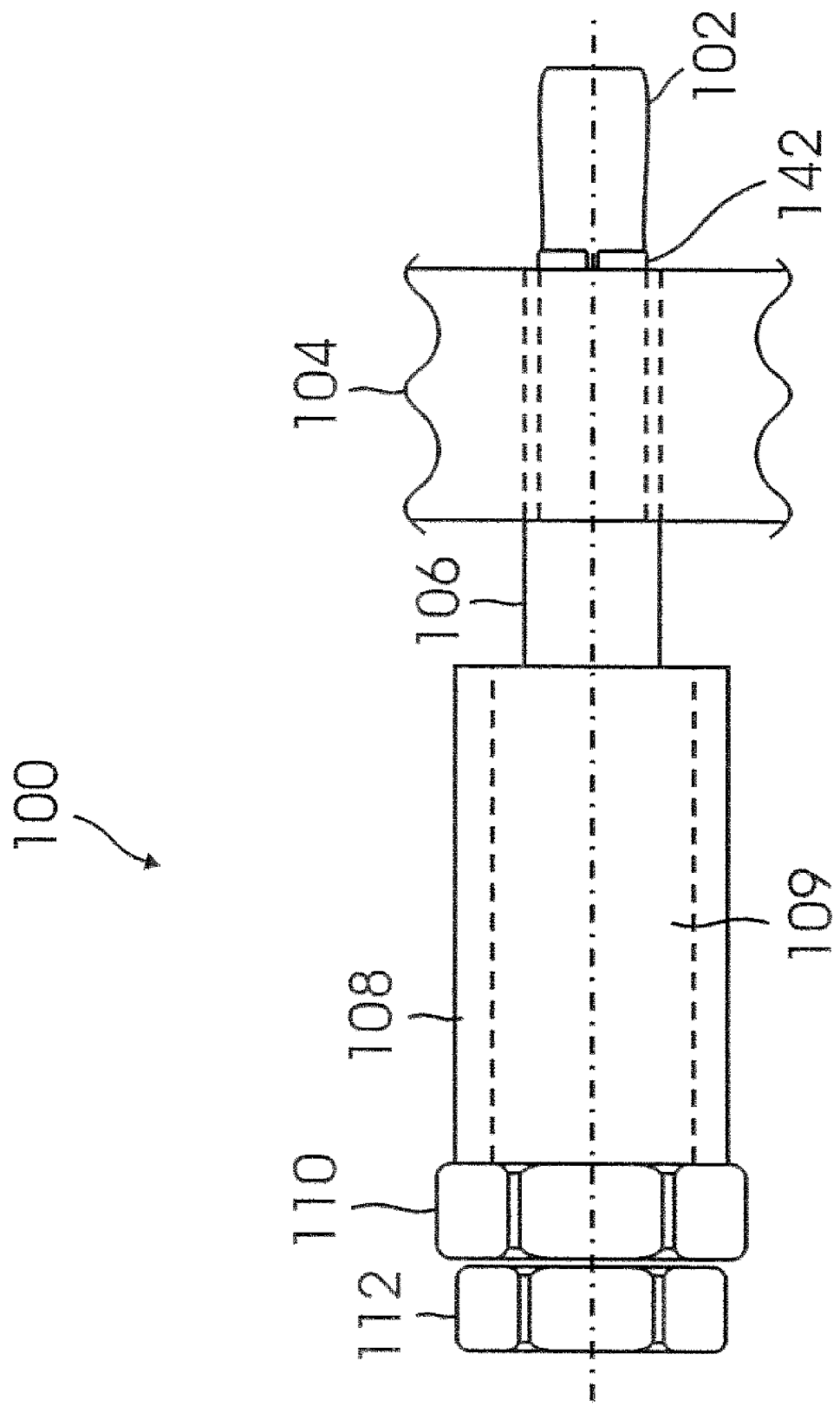
FIG. 1a is an assembled view of a coldwork tool assembly in accordance with an embodiment of the disclosure.
Figure 1B:
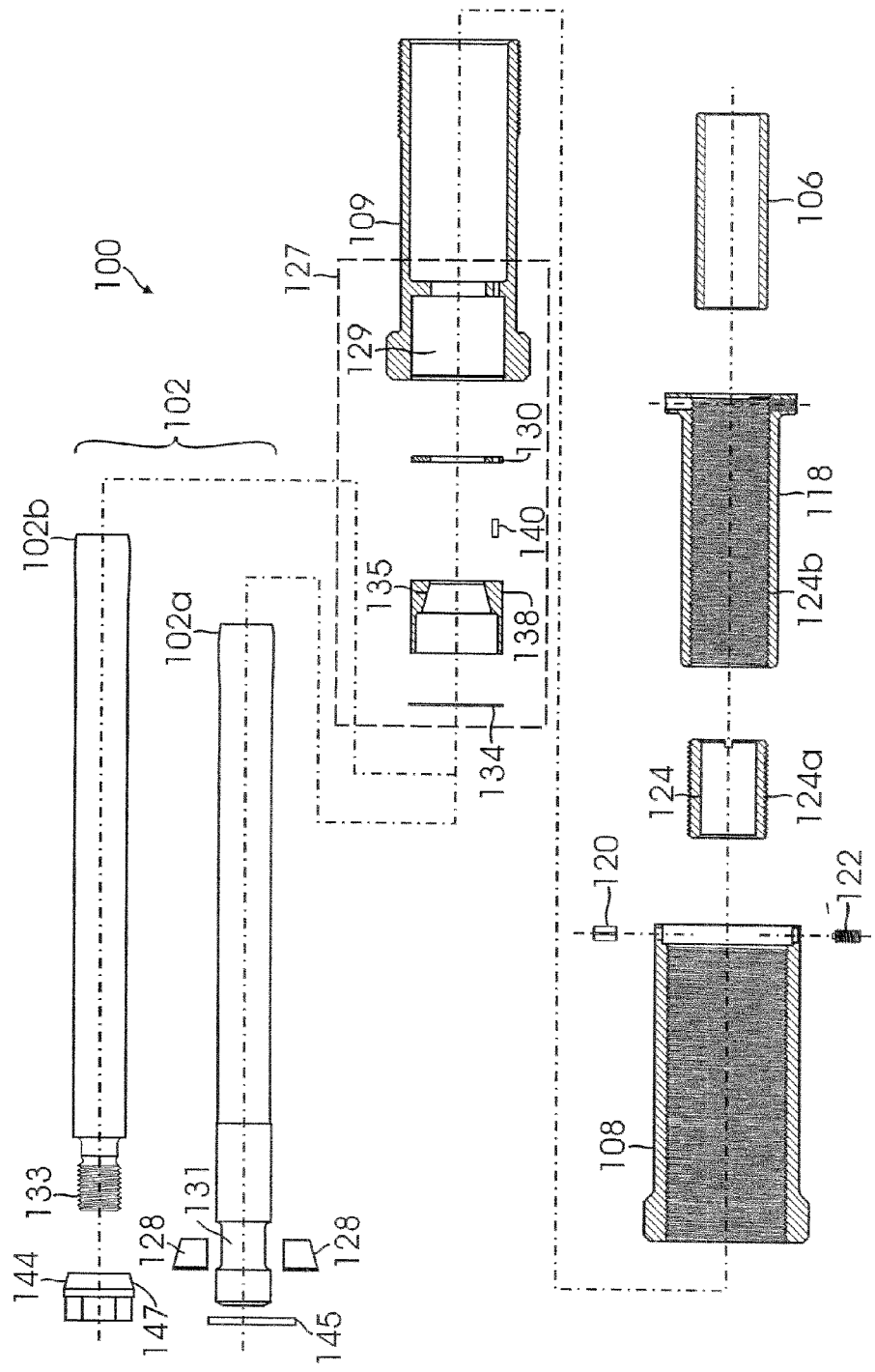
FIG. 1b is a is an exploded view of the work tool assembly of FIG. 1a in accordance with an embodiment of the disclosure.

FIGS. 1a and 1b are assembled and exploded views, respectively, of a coldwork tool assembly 100 (hereinafter "tool 100") in accordance with an embodiment of the disclosure. Tool 100 is used to enlarge a hole in part 104 by plastically deforming the material of part 104 to increase the strength of the material around the hole, which allows the material to better resist localized stress concentrations.

Tool 100 includes a mandrel 102 coupleable to inner housing 109, and disposed in a telescopic arrangement within outer housing 108. Some of the components of the internal structures of tool 100 can be changed allowing for tool 100 to accommodate more than one mandrel style. In one embodiment, mandrel 102 is a grooved mandrel shown as mandrel 102a in FIG. 1b. In another embodiment mandrel 102 is a threaded mandrel shown as mandrel 102b in FIG. 1b. It should be understood that with the exception of mandrels 102a and 102b and associated adapters used to couple mandrels 102a and 102b to inner housing 109, as described in detail below, the structure of both embodiments of tool 100, are substantially identical. References made to mandrel 102 apply to both mandrels 102a 102b unless specified otherwise.

As shown in FIG. 1a, tool 100 also includes a first wrenchable end 110 disposed at the end of outer housing 108 and a second wrenchable end 112 disposed at an end of inner housing 109. Each wrenchable end 110 and 112 allows for the relative fixing and rotating of inner housing 109 relative to outer housing 108, either manually or using a wrench or an equivalent tool.

Referring now to FIG. 1b, tool 100 includes a thrust reaction bushing 106, which extends over a portion of the outer surface of mandrel 102. Thrust reaction bushing 106 is disposed in inner member 118 to react against part 104 while tool 100 operates between an expanded and contracted position. Thrust reaction bushing 106 is retained within inner member 118 using socket set screw 122. Thrust reaction bushing 106 compensates for parts having different thicknesses and allows the use of a single mandrel 102 by extending or retracting thrust reaction bushing 106, by rotating threaded member 124 into or out of inner housing 109.

As previously mentioned, tool 100 includes outer housing 108, which is in telescopic arrangement with inner housing 109. In addition, outer housing 108 is coupled to inner member 118 using roll pin 120. In this embodiment, inner member 118 includes an external threaded member 124 having a threaded portion 124a which corresponds to a threaded portion 124b on an inner surface of inner member 118. The mating threaded portions 124a and 124b allow inner member 118 to impart a force against thrust reaction bushing 106 while inner housing 109 is threaded into (contracted position, FIG. 2a) or out from (expanded position, FIG. 2b) outer housing 108. As inner housing 109 is moved to the expanded position, inner member 118 provides a reaction force to thrust reaction bushing 106 to keep part 104 fixed relative to mandrel 102.

In one embodiment, inner housing 109 includes an adaptive portion 127. Adaptive portion 127 includes adapters and other components that allow for the replacing of a variety of mandrel types to be used in tool 100. In one embodiment components of adaptive portion 127 include a thrust washer 130, a removable retaining ring 134, a retaining collar 138 and a pin 140. Pin 140 couples thrust washer 130 to inner housing 109. Thrust washer 130 and removable retaining ring 134 capture retaining collar 138 in position within retaining space 129 defined in inner housing 109. Thrust bearing 130 prevents the rotation of inner housing 109 from being imparted to mandrel 102 and adaptive portion 127, which helps reduce the force necessary to pull mandrel 102 through part 104.

In one embodiment retaining collar 138 has an internal shape configured to receive an end portion, of mandrel 102 and hold mandrel 102 in fixed position relative to inner housing 109, such that as inner housing 109 expands out relative to outer housing 108, mandrel 102 also traverses with inner housing 109.

In one embodiment, mandrel 102 is a grooved mandrel 102a. Grooved mandrel 102a includes a grooved portion 131 into which adapters 128 are seated. In operation, grooved mandrel 102a is disposed into retaining collar 138 such that adapters 128 mate with an internal surface of retaining collar 138. Adapters 128 act as shims to allow grooved mandrel 102a to be force fit into retaining collar 138. Since adapters 128 have an inclined surface relative to retaining collar 138, adapters 128 can be removed. A retaining ring 145 may be positioned in space 129 to hold adapters 138 in position during operation.

In one embodiment, mandrel 102 may be a threaded mandrel 102b. Threaded mandrel 102b includes a threaded portion 133 which mates to a threaded portion disposed within threaded retaining device 144 in operation, threaded mandrel 102b is disposed into retaining collar 138 such that threaded portion 133 resides within space 129. Retaining device 144 is threaded over threaded portion 133 until an external inclined surface 47 of retaining device 144 mates with an internal surface of retaining collar 138. The contact between the surfaces acts as means to hold threaded mandrel 102b within retaining collar 138. In this manner, tool 100 can be used with a variety of threaded mandrels 102b having the appropriate threaded portion 133 that mates with retaining device 144.

Figure 2A:
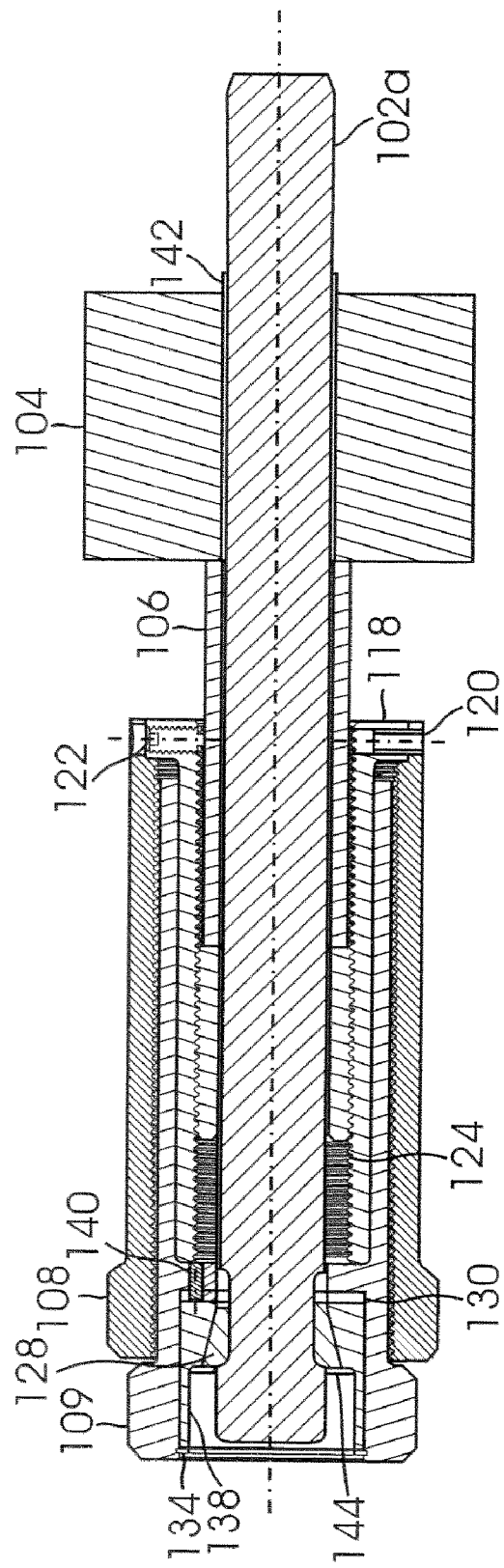
FIG. 2a shows an internal structure of a coldwork tool assembly in a contracted position, according to an embodiment of the disclosure.
Figure 2B:
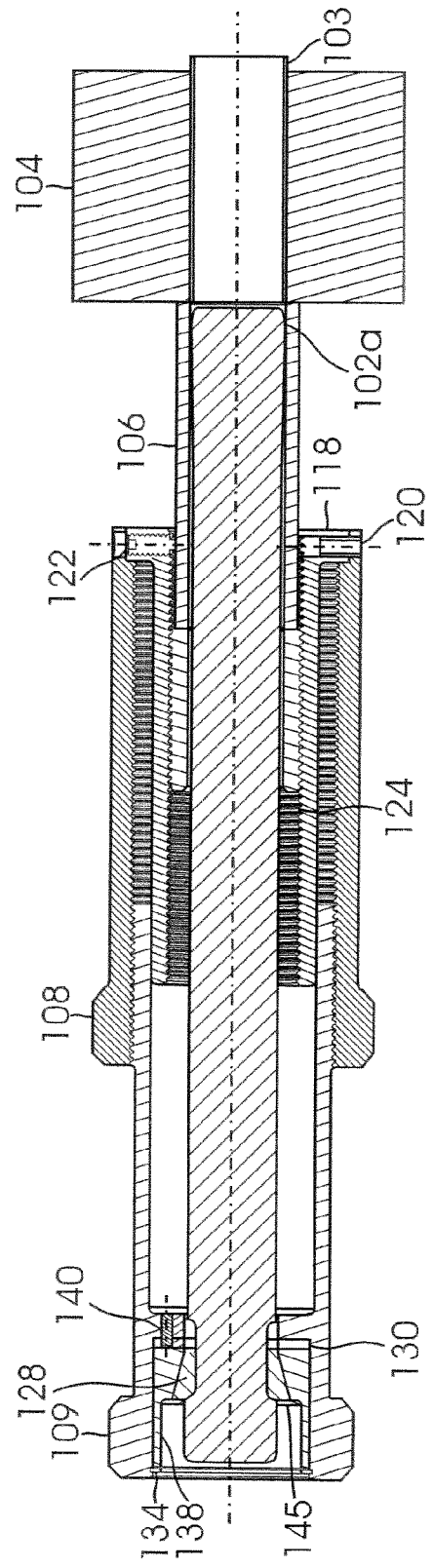
FIG. 2b shows the internal structure of a coldwork tool assembly in an extended position, according to an embodiment of the disclosure.

FIGS. 2a and 2b show an internal structure of tool 100 with mandrel 102a in a contracted position and an expanded position, respectively, in accordance with an embodiment of the disclosure. As shown in FIG. 2b, mandrel 102a is placed through hole 103 in part 104 while expanding tool 100 to the expanded position. In operation, outer housing 108 is held fixed in place while inner housing 109 is rotated relative to outer housing 108 causing inner housing 109 to rotate and unscrew from outer housing 108 expanding tool 100. Adapters 128 having been forced into groove portion 131 and fit into a receptive portion 135 (FIG. 1b) of retaining collar 138 causes mandrel 102a to move relative to outer housing 108 when inner housing 109 is rotated. As tool 100 is expanded from the contracted position, inner member 118 imparts a reaction force on thrust reaction bushing 106 to hold part 104 fixed relative to mandrel 102a and, mandrel 102a is forced or pulled through split sleeve 103 in part 104.

Figure 3A:
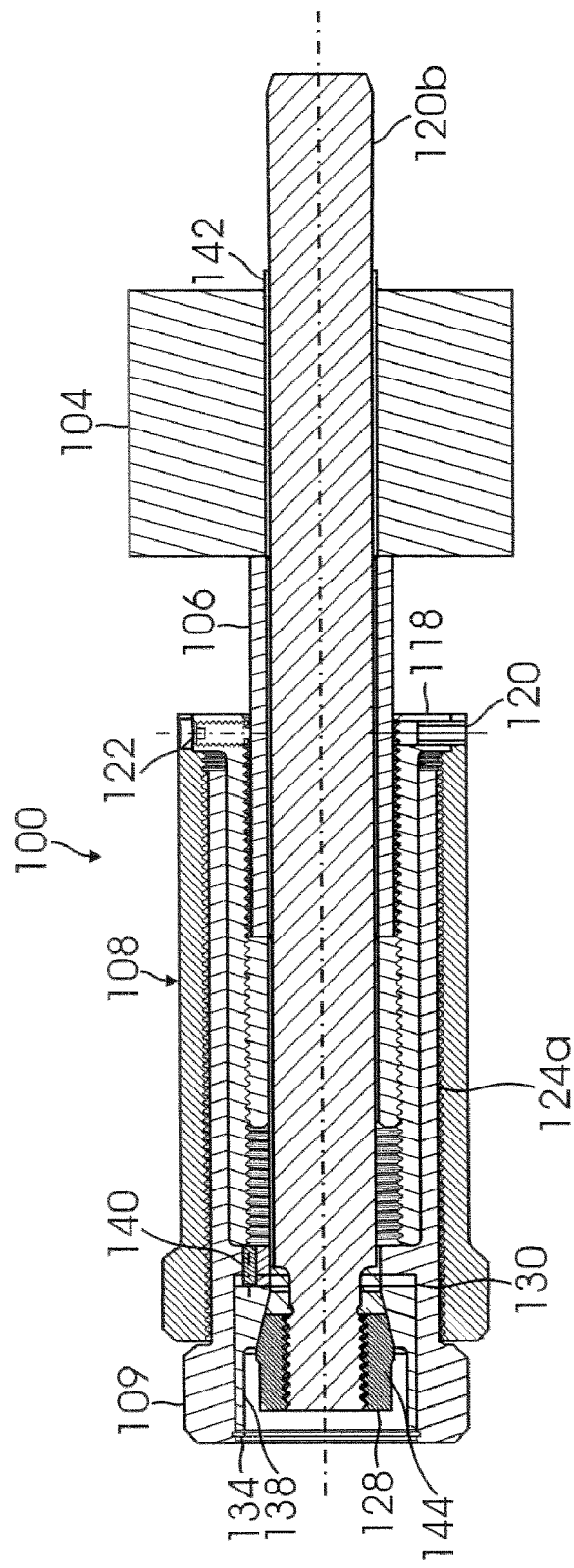
FIG. 3a shows an internal structure of a coldwork tool assembly in a contracted position, according to an embodiment of the disclosure.
Figure 3B:
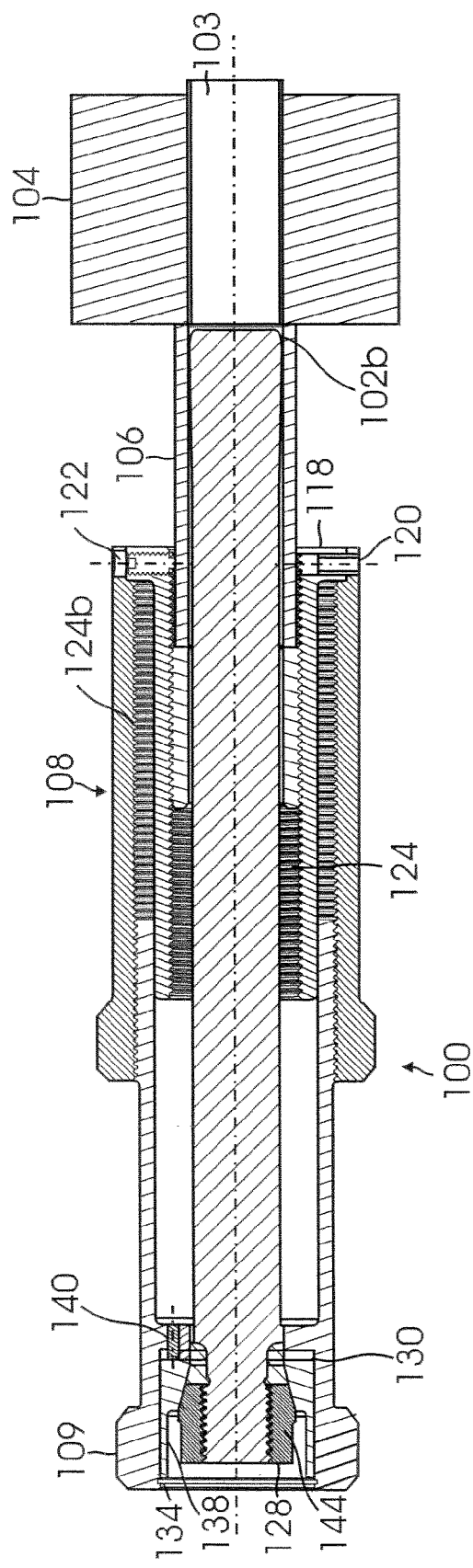
FIG. 3b shows the internal structure of the coldwork tool assembly in an extended position, according to an embodiment of the disclosure.

FIGS. 3a and 3b show an internal structure of tool 100 with mandrel 102b in a contracted position and an expanded position, respectively, in accordance with an embodiment of the disclosure.

In this embodiment, grooved mandrel 102a is replaced by threaded mandrel 102b. To replace grooved mandrel 102a with threaded mandrel 102b (and vice versa), mandrel 102a and adapters 128 are removed through inner diameter of retaining ring 134 allowing for the removal of grooved mandrel 102a. Retaining device 144 is threaded onto threaded portion 133 of mandrel 102b is then inserted into tool 100 with tapered surface of retaining device 144 mating with respective portion 135 (FIG. 1b) of retaining collar 138. Retaining device 144 having been threaded to fit into receptive portion 135 (FIG. 1b) of retaining collar 138 causes threaded mandrel 102b to move relative to outer housing 108 when inner housing 109 is rotated. As tool 100 is expanded from the contracted position, inner member 118 imparts a reaction force on thrust reaction bushing 106 to hold part 104 fixed relative to mandrel 102b and mandrel 102b is forced or pulled through split sleeve 103 in part 104.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A coldwork tool assembly comprising:
   an outer housing;
   an inner housing in telescopic arrangement with said outer housing, said inner housing including a retaining collar; and
   a mandrel disposed at least partially within the inner housing, the mandrel including a first end configured to engage the retaining collar and a second end having an enlarged portion, the enlarged portion extending beyond an end of the inner housing;
   wherein the retaining collar receives the mandrel and is configured to pull the enlarged portion of the mandrel through a hole in a workpiece as the inner housing and the outer housing move relative to one another.

2. The assembly of claim 1, wherein said mandrel is a grooved mandrel and wherein said grooved mandrel is removably coupled to the retaining collar using adapters.

3. The assembly of claim 1, wherein said mandrel is a threaded mandrel and wherein said threaded mandrel is removably coupled to the retaining collar using a threaded retaining device.

4. The assembly of claim 1, wherein the inner housing and outer housing are sized to be hand-held.

5. The assembly of claim 1, wherein an outer surface of the inner housing includes threads and an inner surface of the outer housing includes threads that engage the inner housing threads, such that relative rotation of the inner housing and the outer housing induces telescopic relative movement thereof.

6. The assembly of claim 1, further comprising a thrust reaction bushing configured to bear against a workpiece as the inner housing and the outer housing move telescopically relative to one another from a contracted position to an expanded position.

7. The assembly of claim 6, further comprising a threaded member disposed within the inner housing, the threaded member being configured to bear against and end of the thrust reaction bushing opposite the workpiece.

8. The assembly of claim 6, wherein the thrust reaction bushing is disposed around the mandrel, and the mandrel is configured to slide relative to the thrust reaction bushing.

9. A method of using a coldwork tool assembly comprising:
- passing a mandrel through a hole in a workpiece such that an enlarged portion of the mandrel extends to a first side of the workpiece;
- engaging the mandrel with an inner housing of the assembly such that the inner housing at least partially surrounds the mandrel and the inner housing is disposed on a side of the workpiece opposite the enlarged portion of the mandrel;
- engaging the inner housing with an outer housing such that the inner housing is disposed at least partially within the outer housing and is configured for moving telescopically with respect to the outer housing; and
- moving the inner housing telescopically through the outer housing such that the inner housing pulls the enlarged portion of the mandrel through the hole in the workpiece.

10. The method of claim 9, wherein an outer surface of the inner housing includes threads and an inner surface of the outer housing includes threads that engage the inner housing threads, such that the step of moving the inner housing telescopically through the outer housing comprises rotating the housings with respect to one another.

11. The method of claim 9, wherein as the inner housing pulls the enlarged portion of the mandrel through the hole in the workpiece a thrust reaction bushing bears against a side of the workpiece opposite the enlarged portion of the mandrel.

12. The method of claim 11, wherein as the inner housing pulls the enlarged portion of the mandrel through the hole in the workpiece a threaded member disposed within the inner housing bears against an end of the thrust reaction bushing opposite the workpiece.

13. The method of claim 11, wherein the thrust reaction bushing is disposed around the mandrel, and as the inner housing pulls the enlarged portion of the mandrel through the hole in the workpiece the mandrel slides relative to the thrust reaction bushing.

* * * * *